United States Patent
Fong et al.

(10) Patent No.: US 11,544,360 B2
(45) Date of Patent: Jan. 3, 2023

(54) MASKING BIOMETRIC MARKERS BY SENSOR PATH CONTROL

(71) Applicant: PPIP LLC, Tempe, AZ (US)

(72) Inventors: Michael Fong, Chandler, AZ (US); Nerie Hsin-Wu Fong, Tempe, AZ (US); Teddy David Thomas, Bedford, NH (US)

(73) Assignee: PPIP, LLC, Chandler, AZ (US)

(*) Notice: Subject to any disclaimer, the term of this patent is extended or adjusted under 35 U.S.C. 154(b) by 675 days.

(21) Appl. No.: 16/526,428

(22) Filed: Jul. 30, 2019

(65) Prior Publication Data

US 2021/0034724 A1 Feb. 4, 2021

(51) Int. Cl.
| | |
|---|---|
| G06F 21/32 | (2013.01) |
| G06V 40/16 | (2022.01) |
| G06V 40/20 | (2022.01) |
| G06V 40/12 | (2022.01) |
| G06V 40/10 | (2022.01) |
| G06V 40/50 | (2022.01) |

(52) U.S. Cl.
CPC .......... *G06F 21/32* (2013.01); *G06V 40/1347* (2022.01); *G06V 40/16* (2022.01); *G06V 40/25* (2022.01); *G06V 40/15* (2022.01); *G06V 40/53* (2022.01)

(58) Field of Classification Search
CPC ........ G06F 21/32; G06V 40/16; G06V 40/25; G06V 40/1347; G06V 40/15; G06V 40/53
USPC ......................................................... 713/189
See application file for complete search history.

(56) References Cited

U.S. PATENT DOCUMENTS

| | | | | |
|---|---|---|---|---|
| 10,021,079 B2 * | 7/2018 | Nunally | ............. | H04L 63/0435 |
| 10,269,017 B1 * | 4/2019 | Phillips | ............... | H04L 63/0492 |
| 10,354,126 B1 * | 7/2019 | Nagalla | ................. | G06V 40/20 |
| 10,690,763 B2 * | 6/2020 | Shouldice | ............ | A61B 5/7264 |
| 2002/0194003 A1 * | 12/2002 | Mozer | ..................... | G10L 17/00 |
| | | | | 704/270.1 |
| 2009/0064296 A1 * | 3/2009 | Aikawa | ................. | H04W 12/06 |
| | | | | 726/6 |

(Continued)

FOREIGN PATENT DOCUMENTS

| | | | | | |
|---|---|---|---|---|---|
| GB | | 2535999 A | * | 9/2016 | ........... A61B 5/0006 |
| WO | WO-2019074240 A1 | * | 4/2019 | ............. G06F 21/32 |

OTHER PUBLICATIONS

By Jill Scharr, Vysk Phone Cases Provide Physical, Encrypted Security, Published on Jul. 11, 2014.*

(Continued)

*Primary Examiner* — Samson B Lemma
(74) *Attorney, Agent, or Firm* — Fernando & Partners, LLP

(57) ABSTRACT

In accordance with some embodiments, an apparatus that controls sensor paths for privacy protection is provided. The apparatus includes a housing arranged to hold a second device. The apparatus obtains first sensor data that includes a biometric marker associated with a user. The apparatus controls sensor paths by obtaining the first sensor data using sensors on the second device, on the apparatus, and/or on a supplemental functional device. The apparatus further generates second sensor data by masking the biometric marker associated with the user in the first sensor data. The apparatus additionally controls the sensor paths by providing the second sensor data from the first apparatus to the second device.

20 Claims, 10 Drawing Sheets

(56) References Cited

U.S. PATENT DOCUMENTS

| | | | |
|---|---|---|---|
| 2011/0202440 A1* | 8/2011 | Jarrah | G06Q 20/40 |
| | | | 235/375 |
| 2014/0375428 A1* | 12/2014 | Park | H04W 4/80 |
| | | | 340/10.1 |
| 2015/0098631 A1* | 4/2015 | Palmer | G06Q 10/10 |
| | | | 382/118 |
| 2017/0078420 A1* | 3/2017 | Park | H04L 69/18 |
| 2017/0337364 A1* | 11/2017 | Whaley | G06F 21/316 |
| 2018/0106897 A1* | 4/2018 | Shouldice | A61M 16/026 |
| 2018/0108020 A1* | 4/2018 | Thatte | H04L 9/30 |
| 2018/0232508 A1* | 8/2018 | Kursun | G06N 7/02 |
| 2020/0364352 A1* | 11/2020 | Soffer | H04L 63/0464 |
| 2020/0412715 A1* | 12/2020 | Chen | H04W 12/06 |
| 2022/0075050 A1* | 3/2022 | Shouldice | A61B 5/4818 |

OTHER PUBLICATIONS

Ann Cavoukian , RPR Review of Policy Research Advances in Biometric Encryption: Taking Privacy by Design from Academic Research , Review of Policy Research, vol. 29, No. 1 (2012).*

Donny Jacob Ohana, Preventing Cell Phone Intrusion and Theft using Biometrics, IEEE 2013.*

* cited by examiner

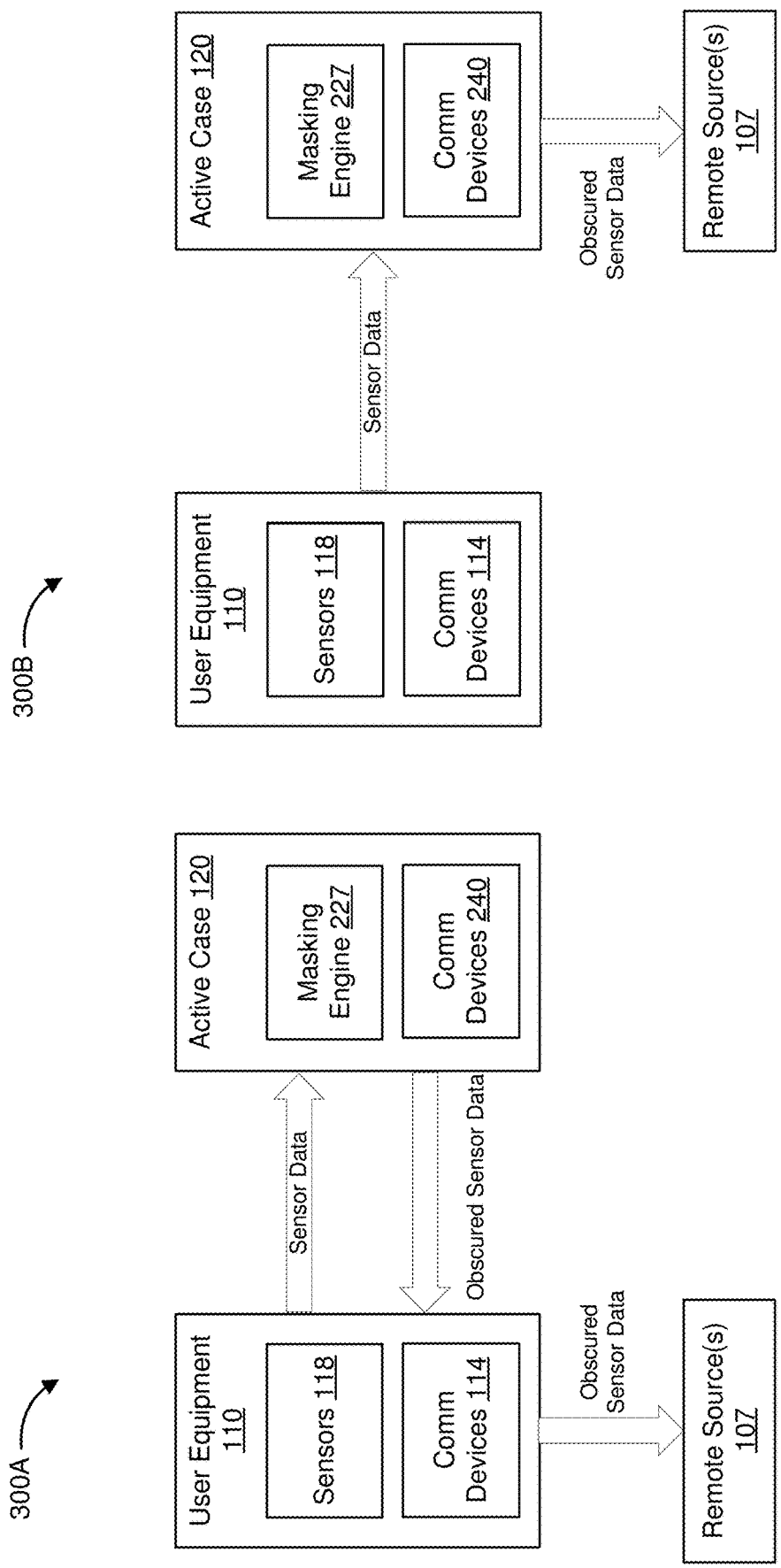

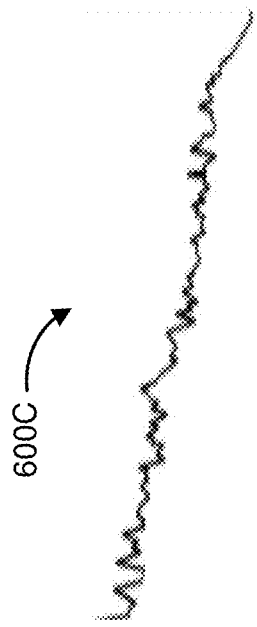
Figure 6B
Figure 6C
Mask Biometric Marker
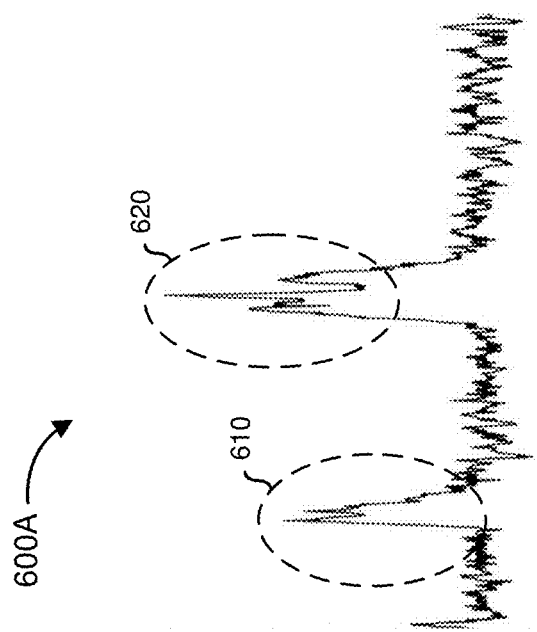
Figure 6A

MASKING BIOMETRIC MARKERS BY SENSOR PATH CONTROL

TECHNICAL FIELD

This relates generally to the field of mobile device communication, and more specifically to an apparatus for controlling sensor paths on a personal communication device and masking biometric makers in sensor data collected by the personal communication device.

BACKGROUND

Various techniques allow extracting biometric information from sensor data (e.g., audio, image, vibration, IMU, etc.). One can then use the extracted biometric information to uniquely identify an individual, and in some cases, derive sensitive information about that particular individual. For example, voice data is typically considered unstructured data. Applying various techniques, telltale biometric markers (including health conditions of a user) can be extracted from voice utterances and/or speech samples. In another example, one can use images captured by cameras for body language mining, e.g., tracking habits or mood based on postures or facial expression in the image. As such, unbeknownst to the user, based on the information collected by sensors on personal communication devices, businesses can gain an unfair advantage over the individual. Moreover, in case malicious users obtain the derived biometric markers, the biometric markers can be used to defeat authentication methods in systems that utilize biometric authentication (e.g., iris scan, voice recognition, fingerprints).

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

FIGS. 3A-3C are block diagrams illustrating exemplary sensor path control in accordance with some embodiments;

FIGS. 6A-6C illustrate representations of sensor data before and after biometric marker masking in accordance with some embodiments;

Figure 1:
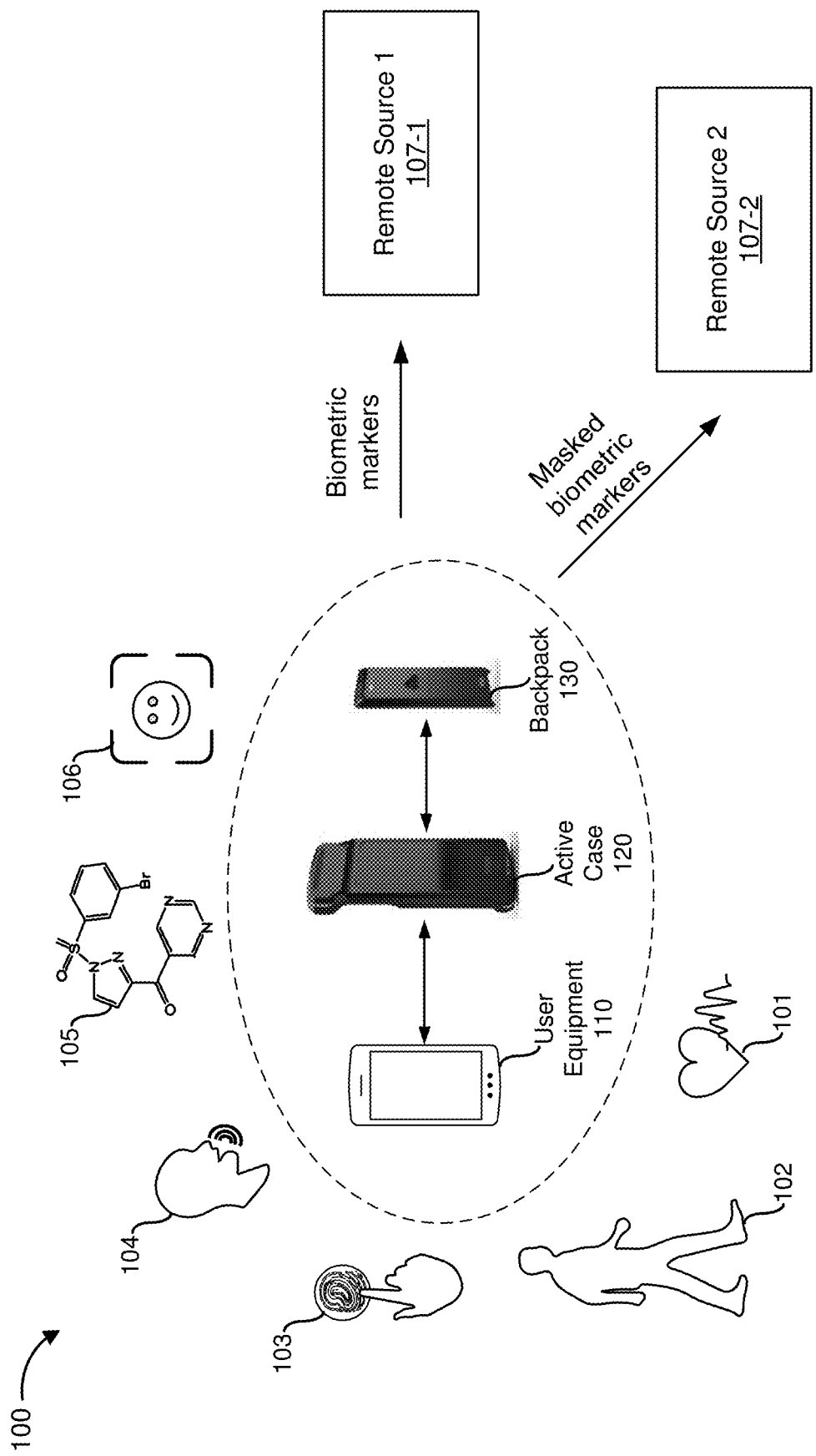
FIG. 1 is a block diagram of an exemplary apparatus that masks biometric markers for privacy protection in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Systems, devices, and methods in accordance with embodiments disclosed herein protect individuals from private data mining. As explained above, a third party (e.g., a malicious user or a business) can derive biometric information from unstructured data and gain an unfair advantage over individuals. For example, an insurance company can use health conditions derived from voice utterance for determining insurance rate. Through an apparatus (also known as an active case, an active base, a smart case, or a safe case) disclosed herein, private individuals have more control over data captured by sensors on a personal communication device (e.g., a smartphone, a wearable device, or a tablet, etc.). Such data includes but is not limited to audio data captured by microphones on a smart phone, video data captured by cameras on a tablet, location data captured by GPS on a smart watch, etc.

For instance, in the case of audio data, the apparatus can obscure signals from a sound source, modify the background noise, morph the signals, and/or encrypt the signals before allowing transmission of such signals to a remote source. The morphed/modified voice of a user and/or masked ambient sound can change the biometric markers (e.g., age, gender, health, location, etc.) embedded in the audio data. In other words, the biometric markers embedded in sensor data can be obscured, e.g., modified acoustic data, generating a blurred image, etc. As such, the apparatus disclosed herein in accordance with embodiments protects user privacy and prevents misappropriation of private information. Moreover, through the apparatus disclosed herein, individuals have more control over private information revealed through sensor data and data paths connecting the sensors to the third party.

In accordance with some embodiments, a method is performed at a first apparatus that includes a housing arranged to hold a second device. The method includes obtaining first sensor data that includes a biometric marker associated with a user; generating second sensor data by obscuring the biometric marker associated with the user in the first sensor data; and providing the second sensor data from the first apparatus to the second device.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting", depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Referring to FIG. 1, an exemplary operating environment 100 in which an active case 120 (also known as an active base, a smart case, or a safe case) controls sensor paths for privacy protection, in accordance with some embodiments. As will be explained below with reference to FIG. 2, the active case 120 includes a housing arranged to hold a user equipment 110. Further, the active case 120 includes a peripheral interface to connect to a supplemental functional device 130 (also known as a backpack). The sensors on the user equipment 110, the active case 120, and/or the backpack 130 can collect data associated with a user of the user equipment 110. Such data reflect, for example, heart and/or pulse patterns 101, gait 102, fingerprints 103, voice 104, odor/scent 105, facial image 106 of the user, among others. In some embodiments, biometric markers can be derived from the data collected by the sensors.

Biometric markers (or biometric identifiers) typically refer to the distinctive, measurable characteristics used to label and describe individuals. Biometric markers can reflect physiological and/or behavioral characteristics of individuals. Physiological characteristics are related to the function or shape of human body. Examples include, but are not limited to brain signal patterns, heart patterns, fingerprint, palm veins, face recognition, DNA, palm print, hand geometry, iris recognition, retina, and/or odor/scent. Behavioral characteristics are related to the pattern of behavior of a person, including but not limited to typing rhythm, gait, voice, RF emission pattern, and/or GPS location pattern of the personal.

In some embodiments, the active case 120 controls the sensor paths such that data obtained by the sensors are processed by the active case 120. Biometric markers embedded in the sensor data are masked by the active case 120. Further, as will be described below with reference to FIG. 2, the active case 120 also controls communication paths. For instance, as shown in FIG. 1, the active case 120 controls the transmission of the sensor data, such that the sensor data with biometric markers can be transmitted to a first remote source 107-1, e.g., a secure server for authentication and/or access control. On the other hand, for privacy protection of the user, the sensor data with obscured biometric markers can be transmitted to a second remote source 107-2, e.g., an unknown server.

Figure 2:
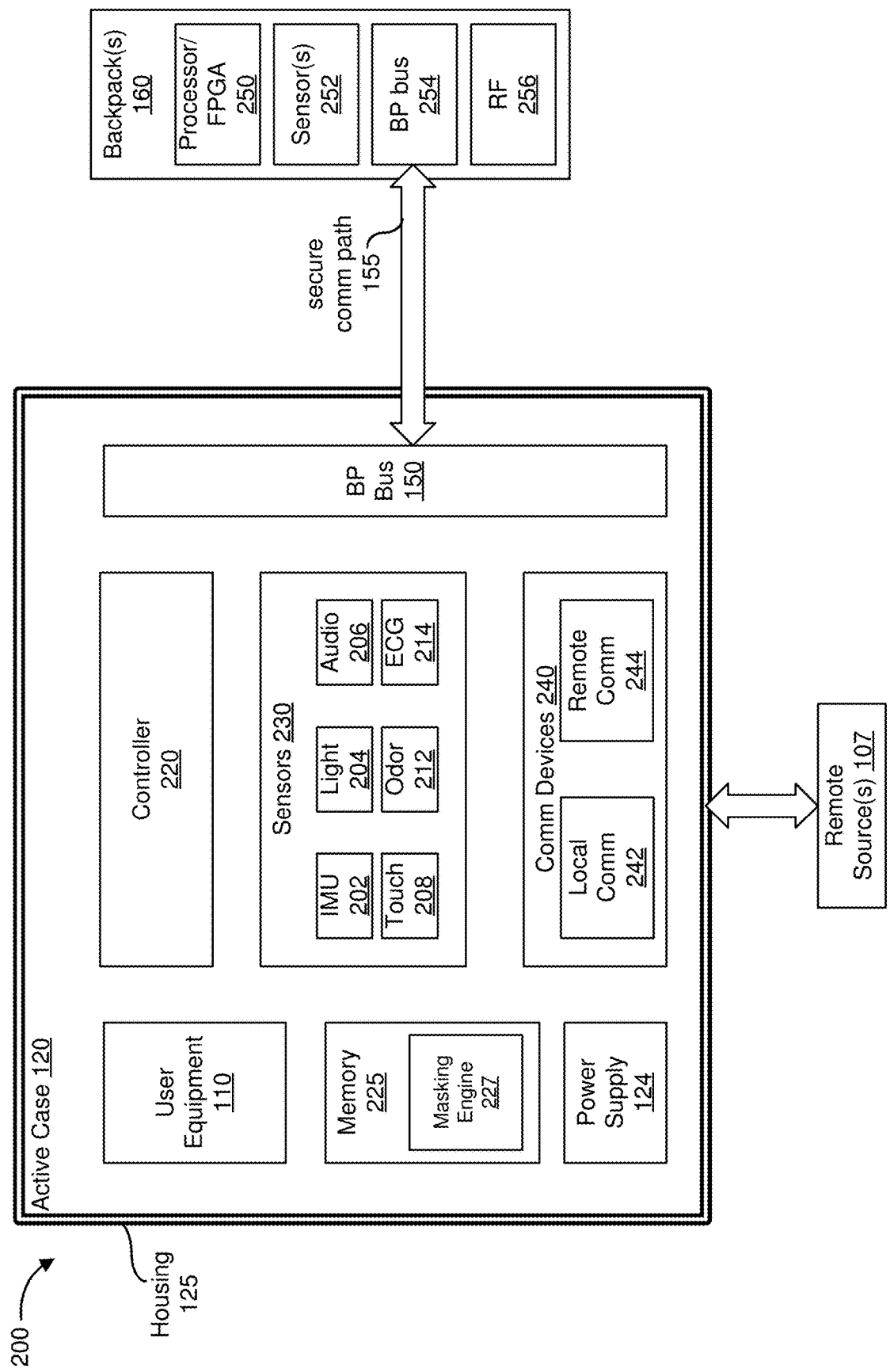
FIG. 2 is a block diagram of an exemplary apparatus that holds a user equipment and controls sensor paths in accordance with some embodiments.

Turning to FIG. 2, FIG. 2 illustrates a block diagram 200 of the active case 120 holding the user equipment 110 and controlling sensor paths is depicted, in accordance with some embodiments. As will be described in further detail below, different from a conventional base or case that merely holds a user equipment, the active case 120 monitors and analyzes activities on the user equipment 110 and actively controls sensor paths and/or communication paths on the user equipment 110. In some embodiments, the active case 120 includes a housing 125 arranged to hold the user equipment 110 (e.g., smartphone, wearable, tablet, etc.). In some embodiments, the housing 125 includes a plurality of components mateable with one another. In other words, the plurality of components, once mated with one another, form an assembly to hold and/or providing structural support of the user equipment 110. The housing 125 allows a user to insert the user equipment 110 into the active case 120 for more protection of sensitive information or take the user equipment 110 out of the active case 120 for less monitoring of the user equipment 110.

The active case 120 can have one or more moveable components (e.g., a hood) operable to slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure that at least partially support and hold the user equipment 110. When in the first position, the housing 125, along with other components of the active case 120, protects the user equipment 110 against data mining, tracking, and/or spying, e.g., by audio jamming, camera covering, and/or RF shielding, etc. When the one or more moveable components of the housing assembly are in a second position (e.g., a hood slid up), a user can take the user equipment 110 out of the housing 125 and place the user equipment 110 in a non-protected mode.

In some embodiments, the active case 120 includes a plurality of sensors 230. The plurality of sensors 230 include, for example, as one or more accelerometers, gyroscopes, and/or magnetometers (e.g., as part of an inertial measurement unit (IMU) 202) for obtaining information concerning the position (e.g., altitude) of the user equipment 110, light sensors 204, acoustic sensors 206 (also known as audio sensors), touch sensors 208, odor/scent sensors 212, and/or heart/pulse sensors 214, among others. The plurality of sensors 230 can be used independent of sensors on the user equipment 110 for collecting sensor data.

In some embodiments, the active case 120 includes memory 225, which further includes one or more memory devices, including fixed and/or removable memory devices. In some embodiments, the memory 225 provides a non-transitory computer-readable storage medium for storing computer program instructions (e.g., a masking engine 227) to be executed by the controller 220. In some embodiments, the memory 225 stores sensor data, such as audio data, image data, location data, gait data, chemical data, health data. In some embodiments, when executed by the controller 220, the masking engine 227 obscures the sensor data collected by the sensors 230 and provide obscured sensor data for user privacy protection.

In some embodiments, the active case 120 includes a peripheral interface 150 (e.g., a backpack interface or a backpack buss) to connect to the supplemental functional device 160 (e.g., a backpack). A supplemental functional device, as described herein, is a device connectable to the user equipment 110 through the active case 120 and provides supplemental functional functions to the user equipment 110. The peripheral interface 150 connects the supplemental functional device 160 to the active case 120. In some embodiments, the active case 120 also includes communication devices 240, including one or more local communication devices 242 and/or one or more remote communication devices 244. In some embodiments, the one or more local communication devices 242 relay messages from the peripheral interface 150 to the user equipment 110 and vice versa. As such, the peripheral interface 150 is a modular interface for the backpack 160, which is a detachable device that allows supplemental hardware and software functionalities to be provided to the user.

In some embodiments, the housing 125 at least partially supports the peripheral interface 150. For example, the peripheral interface 150 can include a number of connectors (e.g., contact pins or contact pads as indicated by the dots) connectable to the supplemental functional device 160. In some embodiments, the connectors are affixed to the housing 125 and at least partially supported by the housing 125. The connectors are mateable to an interface of the supplemental functional device 160. In some embodiments, the peripheral interface 150 is wholly supported by the housing 125, such that the peripheral interface 150 is integrated with or embedded in the housing 125. In such embodiments, connectors from the supplemental functional device 160 can be plugged into the peripheral interface 150 in order to connect the supplemental functional device 160 to the active case 120. In some embodiments, the peripheral interface 150 is operable to communicate with the supplemental functional device 160 via a physical wired channel, including communication connectors. The physical channel forms a secure communication path 155 between the active case 120 and the supplemental functional device 160.

It should be noted that the peripheral interface 150 is not limited to physical connectors that can provide a wired connection. In some embodiments, the peripheral interface includes a wireless modem operable to wirelessly communicate with the supplemental functional device 160. In some embodiments, the peripheral interface 150 is coupled to the communication devices 240 and leverages the wireless communication capability of the communication devices 240 to communicate with the supplemental functional device 160. For example, the active case 120 can connect to a wireless communication enabled backpack device 160 through a wireless peripheral interface or through a wireless modem of the communication devices 240. As such, a wireless communication enabled supplemental functional device 160 can communicate with the active case 120 without being in contact with the housing 125 or physically connected to the peripheral interface.

In some embodiments, the local communication device 242 includes a personal communication device interface modem (e.g., a WiFi modem, a BT/BLE radio, an infrared radio, an NFC radio, a Lightning® (a registered trademark of Apple Inc., Cupertino, Calif.) connector, etc.), among others. In some embodiments, the local communication device 242 is operable to provide a communication path (e.g., wirelessly or via physical connection) between the supplemental functional device 160 and the user equipment 110. As such, in one direction, the communication path carries information from the user equipment 110 to the active case 120 for examination and masking in accordance with some embodiments. In the other direction, the communication path carries information from the active case 120 and/or the supplemental functional device 160 to the user equipment 110 in order to protect the user equipment 110 and/or supplement the functionality of the user equipment 110. Additionally, in some embodiments, the communication path extends to include one or more remote communication paths with the remote source(s) 107.

In some embodiments, the one or more remote communication devices 244 connect the active case 120 and the remote source(s) 107 wirelessly or through a wired connection. Wireless connection protocol can be, for example, Wi-Fi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connection can be, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the active case 120 includes a controller 220 coupled to the peripheral interface 150 and the communication devices 240. Embodiments of the controller 220 include hardware, software, firmware, or a combination thereof. In some embodiments, the controller 220 is operable to manage the communication channel between the user equipment 110 and the supplemental functional device 160 and through the communication devices 240 and the peripheral interface 150. In other words, the controller 220 manages a segment of the communication path between the user equipment 110 and the active case 120 through the management of the one or more local communication devices 242; and the controller 220 manages a segment of the communication path between the active case 120 and the supplemental functional device 160 through the management of the peripheral interface 150. Additionally, in some embodiments, the controller 220 manages the extended communication path(s) associated with the remote source(s) 107.

For example, when one remote source 107 (e.g., the second remote source 107-2 in FIG. 1) attempts to communicate with the user equipment 110 held by the active case, the controller 220 can manage the communication path such that the RF signals transmitted or received by the user equipment 110 are degraded, e.g., jamming the RF signals. As a result, in case the remote source 107 is malicious, the degraded RF signals would be illegible. In another example, the controller 220 can also re-route the communication path, such that instead of allowing direct communication between the user equipment 110 and the remote source 107, the controller 220 directs the one or more remote communication devices 244 to communicate with the remote source 107 on behalf of the user equipment 110, e.g., providing obscured sensor data to the remote source 107 for user privacy protection.

In some embodiments, the active case 120 includes a power supply 124. The power supply 124 supplies power to the peripheral interface, the communication devices 240, and/or the controller 220. In some embodiments, the power supply 124 can also supply power to the supplemental functional device 160, e.g., passing energy through the wired or wireless connection with the supplemental functional device 160. In some embodiments, the power supply 124 includes at least one of a battery, a charging socket, a USB connector, a power plug, and/or a power socket. In some embodiments, the power supply 124 includes a connector for a battery. In some embodiments, the power supply 124 includes a plurality of power supplying components, e.g., one battery providing power to the peripheral interface 150, a power plug providing power to the communication devices 240 and/or the controller 220, etc. The plurality of power supply 124 components can be connected to be charged together, charged separately, aggregating power to supply to one or more hardware electronic components of the active case 120, or separately providing power to one or more hardware electronic components of the active case 120.

In some embodiments, the supplemental functional device 160 includes a processing element 250, such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. In some embodiments, the supplemental functional device 160 also includes sensors 252 to collect information, such as sound, light, temperature, chemicals, odor/scent, drug, and/or biometrics measurement of a user, etc. In some embodiments, the supplemental functional device 160 additionally includes a radio frequency (RF) detection device 256 for detecting RF energy emission and transmission.

The information collected by the sensor(s) 252 and/or the RF detection device 256 are processed by the processing element 250 and communicated to the peripheral interface 150 of the active case 120 (e.g., a backpack bus) via the secure channel 155, e.g., through wired connection between the peripheral interface 150 and an interface 254 (e.g., a backpack bus) on the supplemental functional device 160. Upon receiving the information, the peripheral interface 150 of the active case 120 sends the information to the communication devices 240 under the management of the controller 220, and the controller 220 further directs the information to the user equipment 110 in some embodiments. The additional information gathered by the supplemental functional device 160 supplements the functionality of the user equipment 110. Moreover, in some embodiments, the active base 120 analyzes the additional information gathered by the supplemental functional device 160 and uses the information to further determine whether to obscure sensor data in order to protect the user equipment 110.

For example, the sensors 252 can be biosensors for environmental monitoring, clinical diagnostics, and/or food analysis. The processing element 250 conducts preprocessing of the data gathered by the sensors 252 and prepares a summary of the data. The processing element 250 directs the summary data to the user equipment 110 through the secure channel 155 comprising the interface (e.g., the backpack bus) 254, the peripheral interface 150, and the one or more local communication devices 242. Further, the active base 120 determines, based on the environmental monitoring (e.g., the presence of chemical, RF energy, infrared wave, a different set of user biometrics data, etc.), whether the user equipment 110 has been compromised. Thus, the additional data provided by the supplemental functional device 160 not only supplements the functionality of the user equipment 110, but also enhances the function of the active case 120.

Figure 3C:
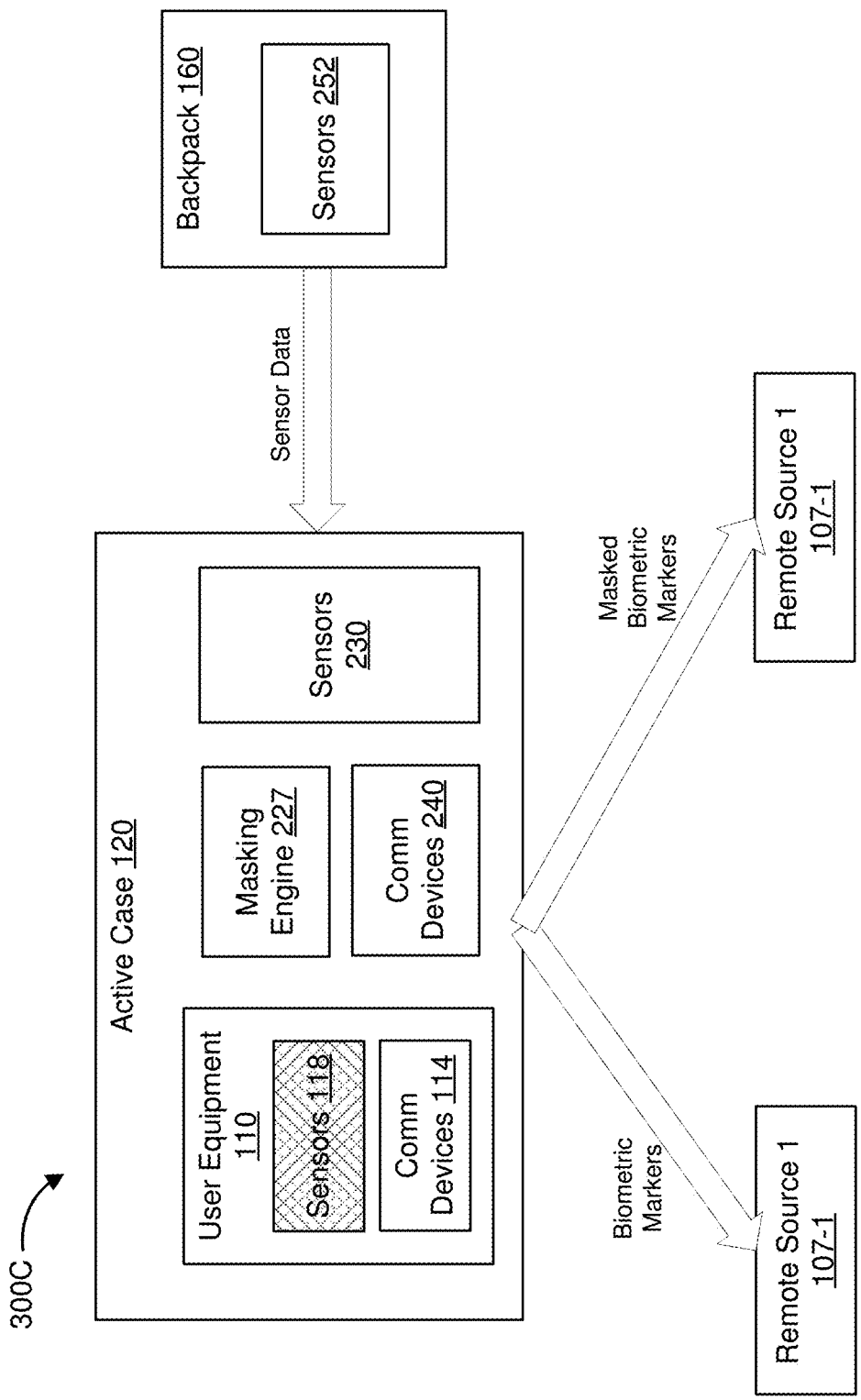

Turning to FIGS. 3A-3C, FIGS. 3A-3C are block diagrams 300A-300C illustrating embodiments of the active case 120 controlling sensor path and communication path associated with the user equipment for sensor data masking. In some embodiments, the user equipment 110 held by the active case 120 includes a processor, communication devices 114, an input/output interface, sensors 118, and memory for storing applications and instructions associated with the application. In some embodiments, the user equipment 110 is a portable communications device, such as a mobile phone, a wearable device, a tablet, a laptop computer, a digital media player, an electronic reader, or the like. In some embodiments, the user equipment 110 is a non-portable device, such as a desktop computer, a data storage device, a smart TV, a video game console, a smart home appliance or the like that is capable of storing, transmitting, and receiving data. It will be appreciated that the components, devices or elements illustrated in and described with respect to FIGS. 3A-3C may not be mandatory and thus some may be omitted in certain embodiments. Additionally, some embodiments can include further or different components, devices or elements beyond those illustrated in and described with respect to FIGS. 3A and 3B.

In some embodiments, the communication devices 114 connect the user equipment 110 and an external electronic device wirelessly or through a wired connection. In some embodiments, the external electronic device is the active case 120, such that the one or more communication devices 114 connect to the active case 120 wirelessly or through a wired communication. In some embodiments, the external electronic device is part of the remote source 107. The wireless communication includes at least one of, for example, Wi-Fi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the user equipment 110 includes the sensors 118, such as one or more accelerometers, gyroscopes, and/or magnetometers (e.g., as part of an inertial measurement unit (IMU)), light sensors, acoustic sensors, fingerprint sensors, touch sensors, heart/pulse sensors, gait sensors, among others. In some embodiments, the sensors 118 are coupled to the input/output interface, such that the information collected by the sensors 118 are passed to the processor by the input/output interface for further processing. For example, the input device camera uses light sensors for light sensing. In some embodiments, the sensors 118 are coupled to the one or more communication devices 114, such that the information collected by the sensors 118 is transmitted to another device (e.g., the active case 120 and/or the remote source 107).

In some embodiments, as shown in FIGS. 3A and 3B, the active case 120 allows collection of data by the sensors 118. However, the active case 120 controls the sensor path, such the sensor data obtained by the sensors 118 are obtained by the active case 120, e.g., via the communication devices 114 of the user equipment 110 and the communication devices 240 of the active case 120. In some embodiments, upon obtaining the sensor data, the masking engine 227 of the active case 120 obscures the sensor data and generates obscured sensor data. In some embodiments, the obscured sensor data are generated by removing biometric markers in the sensor data. The obscured sensor data are then sent to the user equipment 110, e.g., via the communication devices 240 of the active case 120 and the communication devices 114 of the user equipment 110.

In some embodiments, as shown in FIG. 3A, the active case 120 controls the communication path associated with the user equipment 110 such that a segment of the communication path between the user equipment 110 and the one or more remote resources 107 is allowed. In such embodiments, the active case 120 directs the communication devices 114 of the user equipment 110 to transmit obscured sensor data to the one or more remote sources 107. In some embodiments, as shown in FIG. 3B, the active case 120 controls the communication path associated with the user equipment 110 such that a segment of the communication path between the user equipment 110 and the one or more resources 107 is not allowed. In such embodiments, the communication devices 240 of the active case 120 transmit obscured sensor data to the one or more remote sources 107. As such, in case the one or more remote sources 107 are insecure, by controlling the sensor path and the communication path, the active case 120 guards the sensor data with biometric markers for user privacy protection.

In some embodiments, as shown in FIG. 3C, instead of allowing the sensors 118 on the user equipment 110 to collect sensor data, the active case 120 attenuates or blocks the ability of the sensors 118 on the user equipment 110 from collecting sensor data. Instead of obtaining the sensor data from the user equipment 110, the active case 120 utilizes the sensors 230 on the active case 120 and/or the sensors 252 on the backpack for collecting the sensor data. For instance, the active case 120 may not have certain types of sensors or the backpack 160 has more sensitive sensors 252 that are capable of obtaining higher quality sensor data. In such embodiments, the backpack 160 can be attached to the active case 120 and the active case 120 can request the backpack 160 to obtain sensor data. Upon obtaining the sensor data, in some embodiments, the active case 160 can utilize the communication devices 114 on the user equipment and/or the communication device 240 on the active case 120 to communication with the remote sources 107. As shown in FIG. 3C, the sensor data with biometric markers are transmitted to a secure remote source, such as the first remote source 107-1; while the sensor data with masked biometric makers are transmitted to an unknown remote source, such as the second remote source 107-2.

Figure 4B:
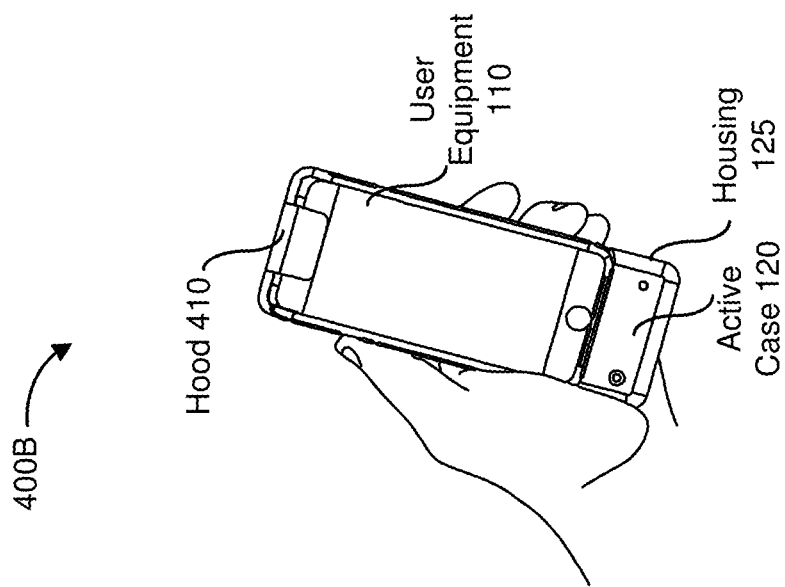
FIGS. 4A and 4B illustrate exemplary light sensor path control in accordance with some embodiments.
Figure 4A:
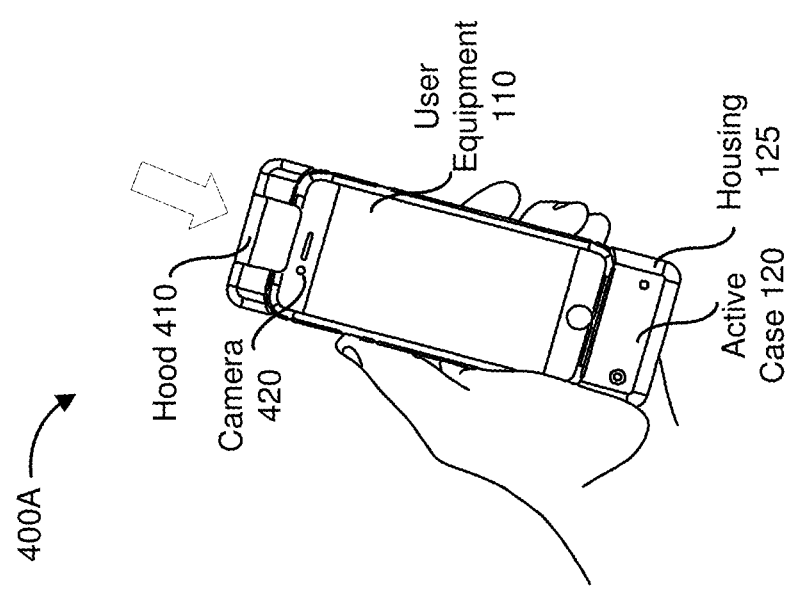

For example, FIGS. 4A and 4B are schematic diagrams 400A and 400B illustrating the active case 120 controlling light sensor path in accordance with some embodiments. As explained above, the active case 120 includes the housing 125 that receives and holds the user equipment 110, which can include a camera 420 comprising light sensors. In some embodiments, the housing 125 is a housing assembly that further includes sub-assemblies, e.g., a plurality of both moveable parts and non-moveable parts that can form an enclosure when assembled together. For example, the sub-assemblies can include a base and a hood assembly 410 that is moveable. In some embodiments, as shown in FIG. 4A, when the hood assembly 410 is moved/slid up or unclamped, the camera 420 on the user equipment 110 is unblocked and can record image data. When the hood assembly 410 is pushed down or lowered (as shown by the arrow in FIG. 4A), the hood assembly 410 can block the camera on the user equipment 110, as shown in FIG. 4B. In FIG. 4B, because the hood assembly 410 blocks the light, the light sensors on the user equipment 110 cannot detect light. As a result, the camera on the user equipment 110 cannot capture images to reveal user private information. In order to obtain image data for authentication purposes, the active case 120 can utilize sensors on the active case 120 and/or the backpack. For example, even in the dark, the active case 120 can use infrared light sensors on the active case 120 and/or the backpack to detect facial images for facial recognition purposes.

Figure 5A:
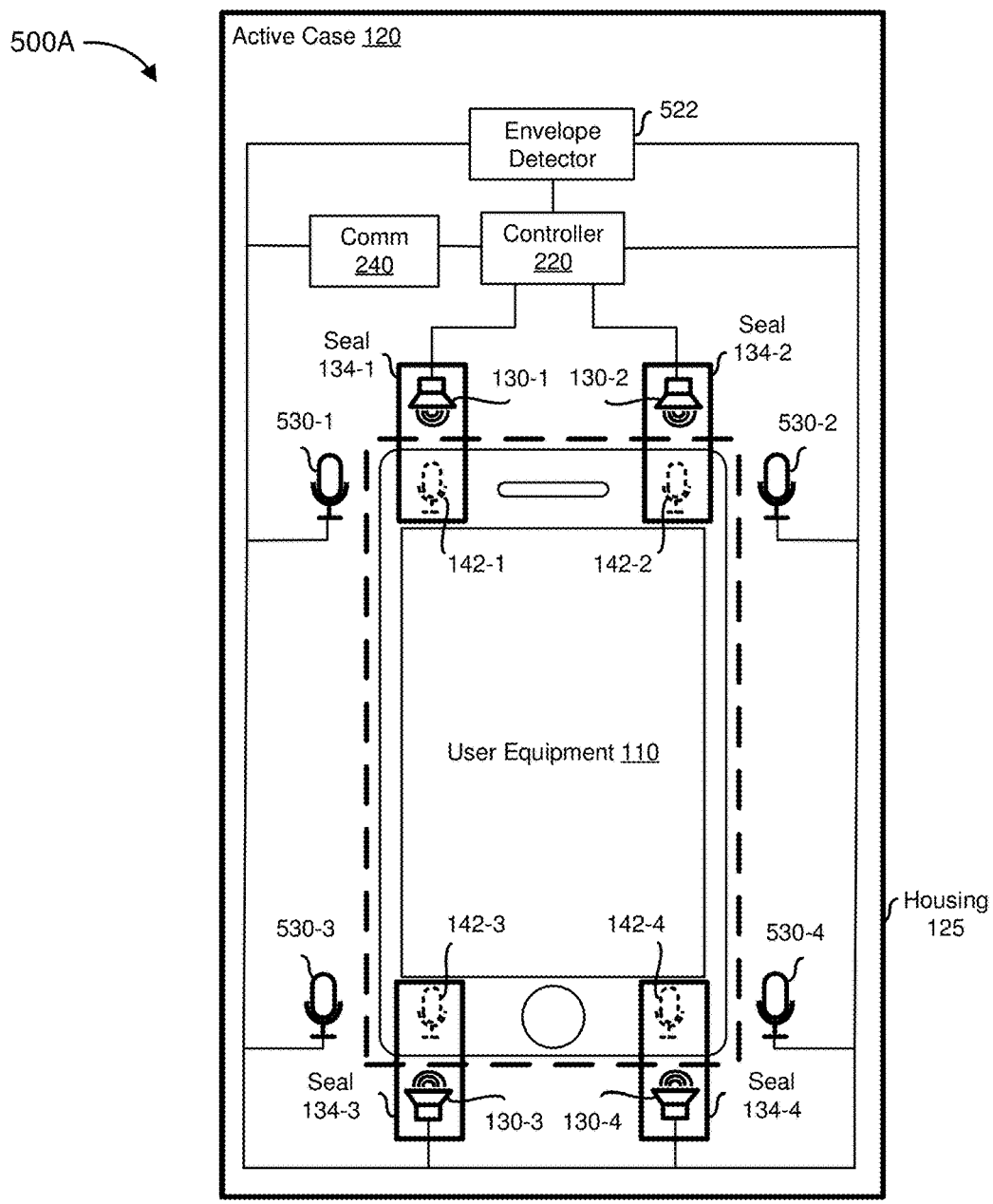
FIGS. 5A and 5B illustrate exemplary audio sensor path control in accordance with some embodiments.
Figure 5B:
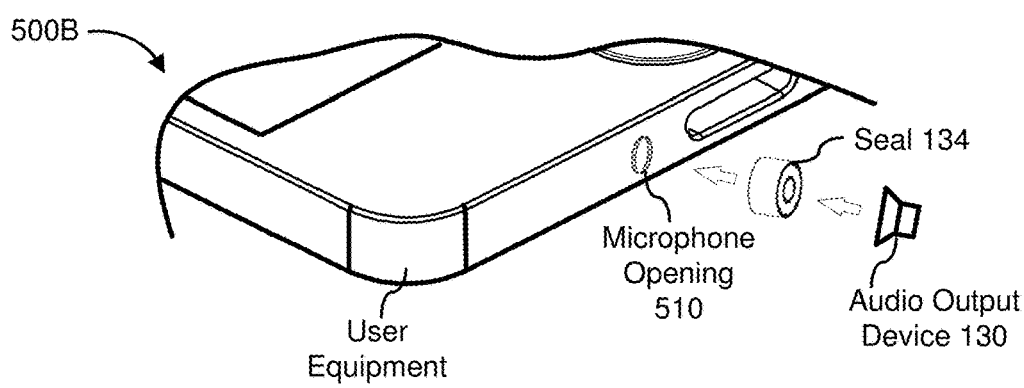

In another example, FIG. 5A is a block diagram 500A and FIG. 5B is a cross-sectional view 500B of a seal 134, where both the block diagram 500A and the cross-sectional view 500B illustrate audio path control in accordance with some embodiments. In some embodiments, the user equipment 110 includes one or more input devices, e.g., the microphones 142-1, 142-2, 142-3, and 142-4. In some embodiments, the one or more input devices 142 include sensors that can obtain data from the surroundings. For example, the microphones 142 include acoustic or audio sensors that can record voice and/or ambient sound. As explained above the active case 120 includes the housing 125 that receives and holds the user equipment 110. In some embodiments, the housing 125 also at least partially supports output devices (e.g., speakers 130), the sensors 230 (not shown in FIG. 3) and the communication devices 240 of the active case 120. Further as explained above, in some embodiments, the housing 125 includes sub-assemblies, e.g., a plurality of both moveable parts and non-moveable parts that can form an enclosure when assembled together. In some embodiments, the sub-assemblies can include a base and a hood assembly that is moveable. For example, when the active case 120 in the privacy protection mode of operation, the hood assembly coordinated with the base engages audio seals 134 to mate the speakers 130 with the microphones 142. The audio seals 134 provide sealing paths between the speakers 130 and the microphones 142. Also in the privacy protection mode of operation, in some embodiments, the active case 120 generates masking signals. The masking signals are outputted from the speakers 130, directed at the microphones 142, and passed through the sealing paths.

In some embodiments, the seals 134 can be made of audio seals, structures, baffles, and/or sound isolating techniques known in the art to help reduce audio energy from outside the sealing paths reaching the speakers 130. For example, FIG. 5B shows a cross-section of the audio seal 134 that forms part of an audio path. The audio seal 134 mates the speaker 130 with a microphone opening 510, behind which a microphone 142 of the user equipment 110 is mounted. In some embodiments, the audio seal 134 is shaped to optimize the acoustical coupling to a targeted microphone of the user equipment 110. This can be achieved by taking into account various factors including, but not limited to, the space available for the audio seal 134, the surface material of the user equipment 110 or the speaker 130, texture and form of an interface to which the audio seal 134 can mate, the acoustical path by which the targeted microphone detects audio content, and/or the level of sealing specified to meet the desired level of attenuation.

In FIG. 5B, as a non-limiting example, the audio seal 134 is positioned between the microphone opening 510 and the speaker 130. In order to cover the round opening of the microphone opening 510, the audio seal 134 has a cut-out surrounded by wall. The cut-out forms a cavity or a chamber inside the wall in a shape of pipe, tube, or tunnel, and the cavity serves as part of the audio-sealing pathway for the audio signal from the speaker 130 to the microphone 142. In some embodiments, the cavity is in the shape of cone, horn, or trumpet so that it amplifies the audio signal directed at the microphone 142. In some embodiments, the audio seal 134 is made of foam material (e.g., polymer foam), flexible or compliant flexible material (e.g., elastomer, neoprene etc.), so that it seals the area surrounding the microphone opening 510. The sealing provided by the audio seal 134 attenuates sound from entering the cavity and attenuates sound from leaking out of the cavity.

In some embodiments, the active case 120 includes the controller 220 that is at least partially supported by the housing 125 and coupled to the speakers 130. In some embodiments, the controller 220 executes instructions stored in non-transitory memory (e.g., part of the memory 225 in FIG. 2) to perform at least certain functions of audio path control, including sound masking. In some embodiments, in order to provide adaptive sound masking, the active case 120 also includes a plurality of input devices, e.g., microphones 530-1, 330-2, 530-3, and 530-4. The microphones 530 are at least partially supported by the housing 125. In some embodiments, the microphones 530 record sound independent of the sound recorded by the microphones 142 on the user equipment 110. In some embodiments, the active case 120 transmits the independently recorded sound to an external electronic device through a secure channel for secure communication and signal processing. In some embodiments, the sound recorded by the microphone(s) 530 is used by an envelope detector 522 included in the active case 120 to facilitate noise shaping.

In some embodiments, the envelope detector 522 is coupled to the microphones 530 and the controller 220. In some embodiments, the envelope detector 522 includes an electronic circuit that takes audio signals (e.g., the ambient sound recorded by one or more of the microphones 530) as an input and provides an output as an envelope associated with the input. The envelope detector 522 thus detects the amplitude variations of the incoming audible signals. In some embodiments, the envelope detector 522 outputs the envelope information to the controller 220. Based on the envelope information, the controller 220 directs the speakers 130 to adjust the volume of the output audio signals from the speakers 130 appropriate for the level of ambient sound. Further, based on the envelope information, the controller 220 (e.g., the masking engine 227 in FIG. 227) can direct the shaping of the audio signal, so that the shaped audio signal has frequency spectrum characterized by the current operating condition of the active case 120.

By controlling the sensor path, sensor data with biometric markers are modified and obscured so that biometric markers are masked. For example, FIG. 6A is an audio signal power and frequency diagram 600A illustrating a segment of exemplary sensor data. The segment includes a first portion 610 and a second portion 620 that may be associated with certain biometric markers. In FIG. 6B, another audio signal power and frequency diagram 600B, the sensor data are obscured to comprise the first portion 610 and a third portion 630 that is different from the second portion 620 (FIG. 6A). As such, the biometric markers embedded in the segment of exemplary sensor data are masked. In FIG. 6C, yet another audio signal power and frequency diagram 600C, the exemplary sensor data have been further obscured, e.g., replaced by a different segment of sensor data. Accordingly, private information would not be revealed when the third party obtains the obscured sensor data.

Figure 7:
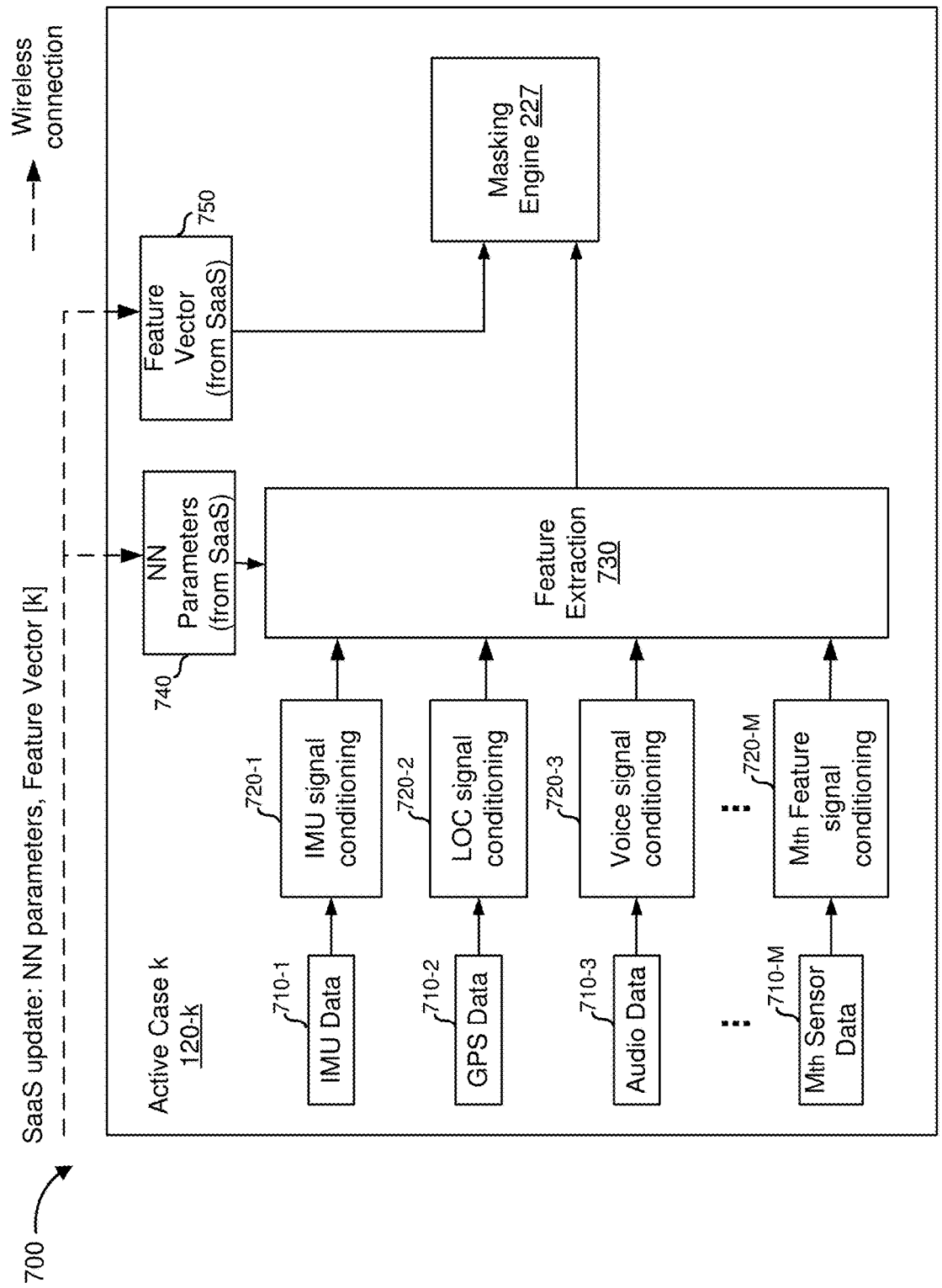
FIG. 7 illustrates biometric marker masking using machine learning in accordance with some embodiments.

FIG. 7 is a simplified block diagram 700 of biometric marker extraction and masking identity and authentication performed on an active case 120-$k$, in accordance with some embodiments. In some embodiments, each of the active case 120 has an identifier and neural network with trained neural network parameters (e.g., NN parameters 815, FIG. 8) as well as feature vectors (e.g., the feature vectors 816, FIG. 8) specific to the active case 120 installed, e.g., receiving neural network parameters and a set of feature vectors [k] from a server as indicated by the dotted line and storing the received parameters and feature vectors [k]. The generation of the neural network parameters and the sent of feature vectors [k] is described in further detail below with reference to FIG. 8.

While the user 111 accesses the user equipment 110-$k$ held by the active case 120-$k$, the sensors 230 (not shown) on the active case 120 and/or the sensors 118 (not shown) on the user equipment 110 (not shown) record the sensor data 710, e.g., IMU data 710-1, location data 710-2, audio data (including voice data) 710-3, Mth sensor data 710-M, etc. After obtaining the sensor data 710, in some embodiments, the active case 120 (e.g., a conditioning unit of the active case 120) conditions the sensor data 710, e.g., IMU signal conditioning 720-1, location signal conditioning 720-2, voice signal conditioning 720-3, Mth feature signal conditioning 720-M, etc. Further, the active case 120 (e.g., a feature extraction unit 730 of the active case 120) extracts feature vectors from the conditioned sensor data using neural network parameters 740 received from the cloud in accordance with some embodiments.

Though FIG. 7 illustrates using the neural network parameters 740 for feature extraction, it should be appreciated that the embodiments are not limited to neural network described herein. A variety of feature extraction techniques can be used. For the sake of brevity, conventional techniques related to the signal processing and data transmission for obtaining the input data for feature extraction and the individual operating components of the machine learning may not be described in detail herein.

In some embodiments, using feature vector [k] 750 received from the cloud, the masking engine 227 of the active case 120 obscures sensor data, e.g., by replacing or removing certain biometric markers corresponding to feature vector [k] 750 from the sensor data. In some embodiments, the extracted feature vectors can be further used for authentication, e.g., by comparing the extracted feature vectors with feature vector [k] 750. For example, the active case 120-k can generate an authentication score reflecting the similarities between the extracted feature vectors by the feature extraction unit 730 and the feature vector [k] 750.

Figure 8:
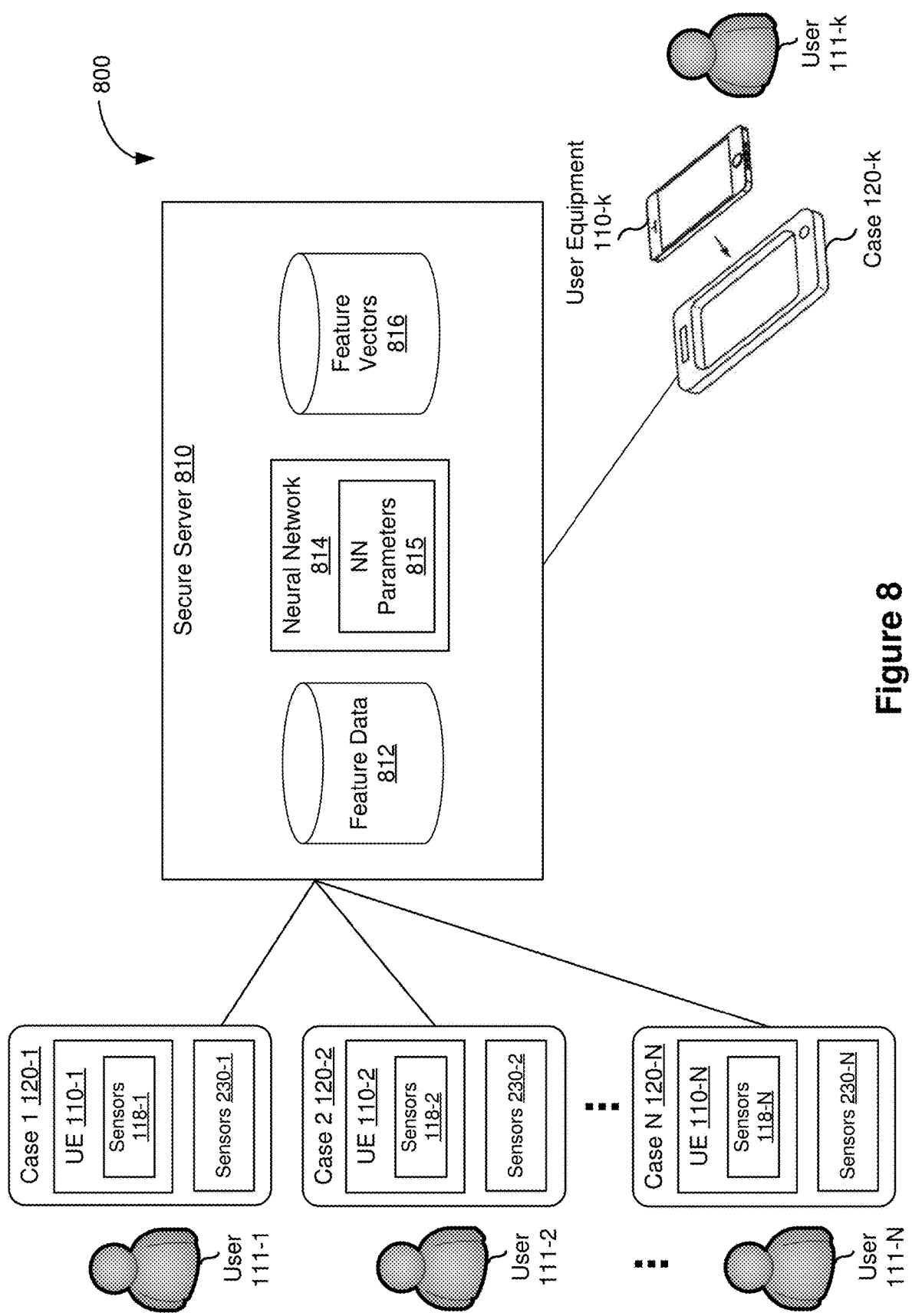
FIG. 8 illustrates an exemplary biometric marker authentication system in accordance with some embodiments.

FIG. 8 is a simplified block diagram of a platform 800 for biometric authentication of users 111 of user equipment 110, in accordance with some embodiments. In some embodiments, the platform 800 for biometric authentication includes a server 810 (e.g., a secure server providing Software as a service (SaaS) and/or the secure remote source 107-1 in FIG. 1). In some embodiments, the server 810 further includes a neural network 814 for machine learning of sensor data obtained from a plurality of active cases 120. Though FIG. 8 illustrates a neural network 814 for machine learning, it should be appreciated that the embodiments are not limited to the neural network described herein. A variety of machine learning techniques can be used. For the sake of brevity, conventional techniques related to the signal processing and data transmission for obtaining the input data for machine learning and the individual operating components of the machine learning may not be described in detail herein.

In the exemplary platform 800, each user equipment 110 can be slid or inserted into a housing (e.g., the housing 125 in FIG. 2) of the corresponding active case 120. This action is indicated in FIG. 8 by the arrow depicting a movement from the user equipment 110-k to the active case 120-k. In some embodiments, during the enrollment phase, the user 111 accesses the user equipment 110 as usual, while the sensors 230 of the active case 120 and/or the sensors 118 of the user equipment 110 collect the sensor data to be communicated to the server 810. In some embodiments, the server 810 stores the sensor data as feature data 812 in preparation for feature vector generation. After observing the user for a period of time, the server 810 learns characteristics from the sensor data by machine learning (e.g., by setting neural network parameters 815 in connection with neurons in the neural network 814), and the server 810 stores the learned patterns in feature vectors 816 for future reference, e.g., for authentication or biometric marker masking as described above. During the authentication, the active case 120 compares the extracted feature vectors with the learned user model stored in the feature vectors 136 to make an authentication decision and gates access (e.g., sending electronic signal or sending password) to the user equipment 110, e.g., locking or unlocking the user equipment 110 held by the active case 120. In some embodiments, the active case 120 gates the access to another device different from the user equipment 110. For example, based on the authentication decision, the active case 120 gates the access to a door or another remote device.

Figure 9:
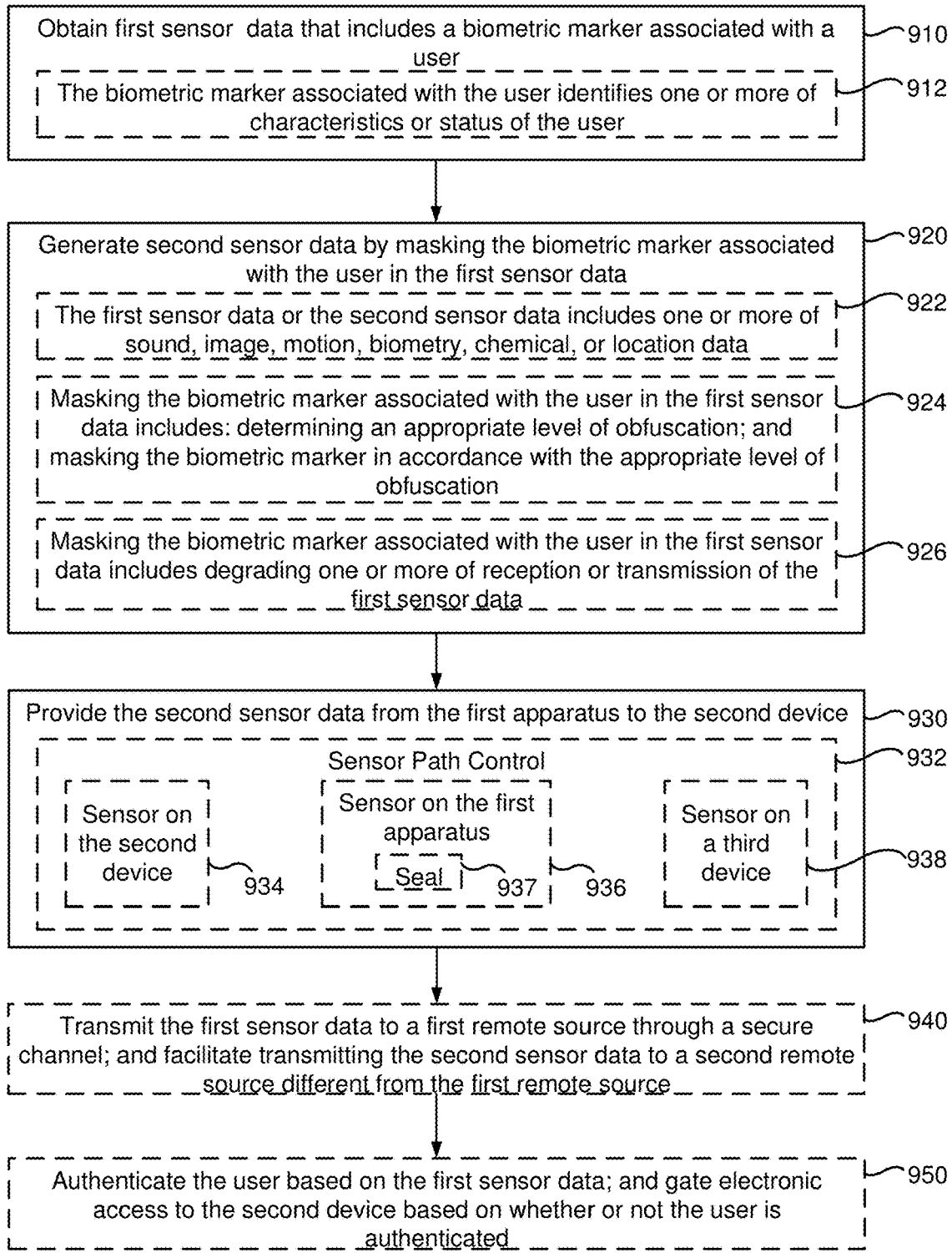
FIG. 9 is a flowchart illustrating a method of biometric marker masking in accordance with some embodiments.

FIG. 9 is a flowchart representation of a method 900 for masking biometric markers, in accordance with some embodiments. In some embodiments, the method 900 is performed at a first apparatus (e.g., the active case 120, FIG. 1) with a housing (e.g., the housing 125, FIG. 2) arranged to hold a second device (e.g., the user equipment, FIG. 2). In some embodiments, the first device also includes a controller (e.g., the controller 220, FIG. 2) for controlling sensor paths and communication paths and a non-transitory memory storing instructions for execution by the controller. In some embodiments, the biometric marker masking method 900 is performed by a masking engine (e.g., the masking engine 227, FIG. 2). Briefly, the method 900 includes obtaining first sensor data that includes a biometric marker associated with a user; generating second sensor data by masking the biometric marker associated with the user in the first sensor data; and providing the second sensor data from the first apparatus to the second device.

To that end, as represented by block 910, the method 900 includes obtaining first sensor data that includes a biometric marker associated with a user. In some embodiments, as represented by block 912, the biometric marker associated with the user identifies one or more of characteristics or status of the user. For example, as shown in FIG. 1, the biometric marker can be a unique pattern of heart and/or pulse patterns 101, gait 102, fingerprints 103, voice 104, odor/scent 105, and/or facial image 106 of a user. In other words, the biometric marker can be used to identify the user, reveal private information such as the health information, traits, behaviors, habits, or whereabouts of the user. As such, the biometric marker can reveal the user's private information.

The method 900 further includes, as represented by block 920, generating second sensor data by masking the biometric marker associated with the user in the first sensor data. In some embodiments, as presented by block 922, the first sensor data or the second sensor data includes one or more of sound (e.g., voice and/or ambient sound from the surrounding), image (e.g., facial image, fingerprint, and/or body pose, etc.), motion (e.g., gaits, gesture, body language, lip movements, and/or finger movement patterns on a touch sensitive surface, etc.), biometry (e.g., heart rate, pulse rhythm, and/or blood pressure patterns, etc.), chemical (e.g., odor, smell, scent, and/or drug composition, etc.), location (e.g., GPS), or telemetry (e.g., wireless and/or wired network connection) data. For example, as shown in FIG. 7, sensor data are analyzed, features are identified and/or extracted, so that known features associated with the user of the active case k 120-k, e.g., feature vector [k], are obscured or removed in order to mask the biometric markers associated with the user. In another example, as shown in FIGS. 6A-6C, data representing a pattern of heart rhythm, gait, voice can be modified so that the pattern is no longer unique (e.g., FIG. 6C shows a known pattern) and/or associated with the user (e.g., the pattern in FIG. 6B is different from FIG. 6A).

In some embodiments, as represented by block 924, masking the biometric marker associated with the user in the first sensor data includes determining an appropriate level of obfuscation and masking the biometric marker in accordance with the appropriate level of obfuscation. For example, as shown in FIG. 5A, the envelope detector 522 can be used to detect the level of ambient sound. Using the information detected by the envelope detector 522, the controller 220 can direct the speakers 130 to output appropriate volume of masking sound and/or direct the masking engine to shape the output sound to the appropriate shape in order to mask the biometric marker in the audio signal captured by the microphones 142 of the user equipment 110.

In some embodiments, as represented by block 926, masking the biometric marker associated with the user in the first sensor data includes degrading one or more of reception by or transmission of the first sensor data from the second device. For example, in FIG. 4B, when the hood assembly 410 blocks the light sensors of the camera 420, the reception of image data is degraded. In another example, in case the first sensor data is location data, e.g., obtained through RF signal exchanges, jamming the RF signal can mask the biometric markers in the RF signals.

The method 900 continues, as presented by block 930, with the first apparatus providing the second sensor data from the active case to the second device in accordance with some embodiments. As represented by block 932, the active case controls the sensor paths so that the first sensor data can be obtained in accordance with various embodiments.

In one embodiment, as represented by block 934, the active case can obtain the first sensor data by receiving from the second device, using a local communication channel, the first sensor data recorded by a sensor on the second device. For example, as shown in FIGS. 3A and 3B, the sensors 118 on the user equipment 110 obtains the sensor data, and the active case 120 obtains the sensor data from the user equipment 110 via the coupling of the communication devices 240 of the active case and the communication devices 114 of the user equipment 110.

In another embodiment, as represented by block 936, the active case utilizes the sensors on the active case for sensor data collection. In such embodiments, as represented by block 937, the method 900 further includes establishing a first channel between the first apparatus and the second device, where the first channel includes a seal that at least partially block data collection by the second device from outside the first channel. Further, in such embodiments, obtaining the first sensor data includes obtaining the first sensor data using a sensor on the first apparatus; and providing the second sensor data from the first apparatus to the second device includes providing the second sensor data from the first apparatus to the second device through the first channel. For example, in FIGS. 5A and 5B, the seal 134 at least partially blocks the microphones 142 from receiving acoustic energy from outside the seal 134. Thus, as shown in FIG. 3C, the greyed-out sensors 118 (e.g., the microphones) on the user equipment 110 cannot obtain sensor data from outside the seal 134. Inside the seal 134 and through the audio path formed by the seal 134, the active case 120 passes the masking sound to the microphones 142. In some embodiments, the masking sound is generated based in part on the audio data recorded by the microphones 530 of the active case 120.

In yet another embodiment, as represented by block 938, the active case utilizes the sensors on a third device (e.g., the backpack 160, FIG. 1) for sensor data collection. In such embodiment, the method 900 further includes establishing a second channel between the first apparatus and a third apparatus. Also in such embodiments, obtaining the first sensor data includes obtaining through the second channel the first sensor data, which is collected using a sensor on the third apparatus. For example, when the camera 420 of the user equipment 110 is blocked, the backpack with infrared camera can record infrared image data and pass the infrared image data to the active case.

Still referring to FIG. 9, in some embodiments, as represented by block 940, the method 900 further includes transmitting the first sensor data to a first remote source through a secure channel; and facilitating transmitting the second sensor data to a second remote source different from the first remote source. For example, as shown in FIGS. 1 and 3C, the first sensor data with biometric markers embedded can be shared with the secure server 107-1 through a secure channel. On the other hand, an unknown remote source 107-2 receives the obscured sensor data with masked biometric markers embedded.

In some embodiments, as represented by block 950, the method 900 further includes authenticating the user based on the first sensor data; and gating electronic access (e.g., allowing or denying the usage of the active case 120 and/or the user equipment 110) to the second device based on whether or not the user is authenticated. For example, using an authentication system shown in FIG. 8, sensor data from a plurality of users 111 are analyzed and features are extracted for authentication purpose.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at a first apparatus including a housing arranged to hold a second device:
obtaining, from a sensor path associated with the second device, first sensor data that includes a biometric marker distinct to a user;
obtaining second sensor data by masking the biometric marker distinct to the user in the first sensor data;
determining whether or not a communication path between the second device and a remote source is secure; and
providing the second sensor data to the sensor path associated with the second device for communication to the remote source in accordance with a determination that the communication path from the second device to the remote source is not secure.

2. The method of claim 1, wherein the biometric marker distinct to the user identifies one or more of characteristics or status of the user.

3. The method of claim 1, wherein masking the biometric marker distinct to the user in the first sensor data includes:
determining an appropriate level of obfuscation; and
masking the biometric marker in accordance with the appropriate level of obfuscation.

4. The method of claim 1, wherein masking the biometric marker distinct to the user in the first sensor data includes degrading one or more of reception by or transmission of the first sensor data.

5. The method of claim 1, wherein obtaining the first sensor data includes:
receiving from the second device, using a local communication channel, the first sensor data recorded by a sensor on the second device.

6. The method of claim 1, further comprising establishing a first channel between the first apparatus and the second device, wherein the first channel includes a seal that at least partially blocks data collection by the second device from outside the first channel.

7. The method of claim 6, wherein:
obtaining the first sensor data includes obtaining the first sensor data using a sensor on the first apparatus; and
providing the second sensor data to the sensor path associated with the second device includes providing the second sensor data from the first apparatus to the second device through the first channel.

8. The method of claim 6, further comprising establishing a second channel between the first apparatus and a third apparatus, wherein obtaining the first sensor data includes obtaining through the second channel the first sensor data, which is collected using a sensor on the third apparatus.

9. The method of claim 1, further comprising:
transmitting the first sensor data to a first remote source through a secure channel; and
facilitating transmitting the second sensor data to the remote source different from the first remote source.

10. The method of claim 1, further comprising:
authenticating the user based on the first sensor data; and
allowing or denying access to the second device based on whether or not the user is authenticated.

11. The method of claim 1, wherein the first sensor data or the second sensor data includes one or more of sound, image, motion, biometry, chemical, location, or telemetry data.

12. An apparatus comprising:
a housing arranged to hold a second device;
a masking engine stored in a non-transitory memory, at least partially supported by the housing, operable to:
obtain, from a sensor path associated with the second device, first sensor data that includes a biometric marker distinct to a user;
obtain second sensor data by masking the biometric marker distinct to the user in the first sensor data;
determine whether or not a communication path between the second device and a remote source is secure; and
provide the second sensor data to the sensor path associated with the second device for communication to the remote source in accordance with a determination that the communication path from the second device to the remote source is not secure.

13. The apparatus of claim 12, wherein the biometric distinct to the user identifies one or more of characteristics or status of the user.

14. The apparatus of claim 12, wherein masking the biometric marker distinct to the user in the first sensor data includes:
determining an appropriate level of obfuscation; and
masking the biometric marker in accordance with the appropriate level of obfuscation.

15. The apparatus of claim 12, wherein masking the biometric marker distinct to the user in the first sensor data includes degrading one or more of reception by or transmission of the first sensor data.

16. The apparatus of claim 12, wherein obtaining the first sensor data includes:
receiving from the second device, using a local communication channel, the first sensor data recorded by a sensor on the second device.

17. The apparatus of claim 12, further comprising a seal, wherein the seal at least partially blocks data collection by the second device from outside a first channel between the first apparatus and the second device.

18. The apparatus of claim 17, wherein:
obtaining the first sensor data includes obtaining the first sensor data using a sensor on the first apparatus; and
providing the second sensor data to the sensor path associated with the second device includes providing the second sensor data from the first apparatus to the second device through the first channel.

19. The apparatus of claim 17, further comprising at least one connector to a third apparatus, wherein the at least one connector is connectable to the apparatus and operable to establish a second channel between the first apparatus and a third apparatus, and obtaining the first sensor data includes obtaining through the second channel the first sensor data, which is collected using a sensor on the third apparatus.

20. The apparatus of claim 12, further comprising a remote communication device at least partially supported by the housing, wherein the remote communication device is operable to:
transmit the first sensor data to a first remote source through a secure channel; and
facilitate transmitting the second sensor data to the remote source different from the first remote source.

* * * * *